(12) United States Patent
Kane et al.

(10) Patent No.: US 12,416,337 B2
(45) Date of Patent: Sep. 16, 2025

(54) CLUTCH ASSEMBLY

(71) Applicant: Means Industries, Inc., Saginaw, MI (US)

(72) Inventors: Spencer Kane, Chesaning, MI (US); Joshua D Hand, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 19/101,391

(22) PCT Filed: Apr. 25, 2024

(86) PCT No.: PCT/US2024/026302
§ 371 (c)(1),
(2) Date: Feb. 5, 2025

(87) PCT Pub. No.: WO2024/226823
PCT Pub. Date: Oct. 31, 2024

(65) Prior Publication Data
US 2025/0257768 A1    Aug. 14, 2025

Related U.S. Application Data

(60) Provisional application No. 63/461,866, filed on Apr. 25, 2023.

(51) Int. Cl.
*F16D 41/04*    (2006.01)
*F16D 41/12*    (2006.01)

(52) U.S. Cl.
CPC ............. *F16D 41/12* (2013.01); *F16D 41/04* (2013.01)

(58) Field of Classification Search
CPC .................................. F16D 41/04; F16D 41/12
See application file for complete search history.

(56) References Cited

U.S. PATENT DOCUMENTS

| | | | |
|---|---|---|---|
| 5,160,005 A * | 11/1992 | Burch | F16D 41/12 192/104 C |
| 2009/0159391 A1* | 6/2009 | Eisengruber | F16D 41/16 192/48.7 |
| 2011/0192693 A1 | 8/2011 | Bradley | |
| 2014/0048372 A1 | 2/2014 | Walker et al. | |
| 2016/0290417 A1* | 10/2016 | Brubaker | F16D 41/14 |
| 2016/0305495 A1 | 10/2016 | Itagati | |
| 2019/0277353 A1* | 9/2019 | Przybyla | B64C 11/00 |
| 2020/0124115 A1 | 4/2020 | Hand et al. | |
| 2022/0397164 A1 | 12/2022 | Geiser et al. | |

* cited by examiner

*Primary Examiner* — Lori Wu
(74) *Attorney, Agent, or Firm* — Burgess Law Office, PLLC

(57) ABSTRACT

A clutch assembly includes a first coupling assembly and a second coupling assembly. The first and second coupling assemblies have a common input member wherein the first coupling assembly couples/decouples the input member and a first output member, and the second coupling assembly couples/decouples the input member and a second output member. In the first position, the first coupling assembly decouples the input member and the first output member, and the second coupling assembly couples the input member and the second output member. In the second position, the first coupling assembly couples the input member and the first output member, and the second coupling assembly decouples the input member and the second output member.

20 Claims, 16 Drawing Sheets

CLUTCH ASSEMBLY

CROSS-REFERENCE TO RELATED APPLICATIONS

This application is a National Stage of International Application No. PCT/US2024/026302, filed Apr. 25, 2024, and claims the benefit of U.S. Provisional Application No. 63/461,866, filed on Apr. 25, 2023. The disclosures of the above applications are incorporated herein by reference.

BACKGROUND OF THE INVENTION

1. Field of the Invention

The invention generally relates to a vehicle power train or drive system; and, more specifically, a drive system using a clutch assembly including a locking element for coupling and decoupling clutch members to control power flow or power transfer in a vehicle drive train.

2. Description of Related Art

In the field of automotive technology, vehicle powertrains or drive systems typically incorporate multiple clutch elements. Existing powertrains may be configured as concentric and parallel axis architectures. The powertrains often use electric motors and controllable or selectable coupling assemblies, such as one-way clutches. These coupling assemblies can be electromagnetically operated and magnetically controlled.

These one-way clutches often include first and second members and at least one locking element, for example, a strut, moving between a deployed position, wherein the strut extends from the first member and engages the second member, and a nondeployed position, wherein the strut does not extend from the first member. Whereby the first and second members are disengaged from each other.

Various types of selectable one-way clutches are known, including those using a selector plate, a solenoid, and a linear actuator. The foregoing are examples of one-way clutches that may be used in the clutch system disclosed herein. The foregoing are not exclusive; other selective or one-way clutches may be used and are known.

SUMMARY OF THE INVENTION

A clutch assembly for use with a vehicle drive system includes an input member, a first output member, and a second output member. A first coupling assembly selectively couples the input member to the first output member, and a second coupling assembly selectively couples the input member to the second output member. The assembly includes an actuation mechanism that moves between first and second positions. In the first position, the first coupling assembly decouples the input member and the first output member and couples the input member and the second output member. In the second position, the second coupling assembly decouples the input member and the second output member and couples the input member and the first output member.

Further areas of applicability of the present invention will become apparent from the detailed description provided. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
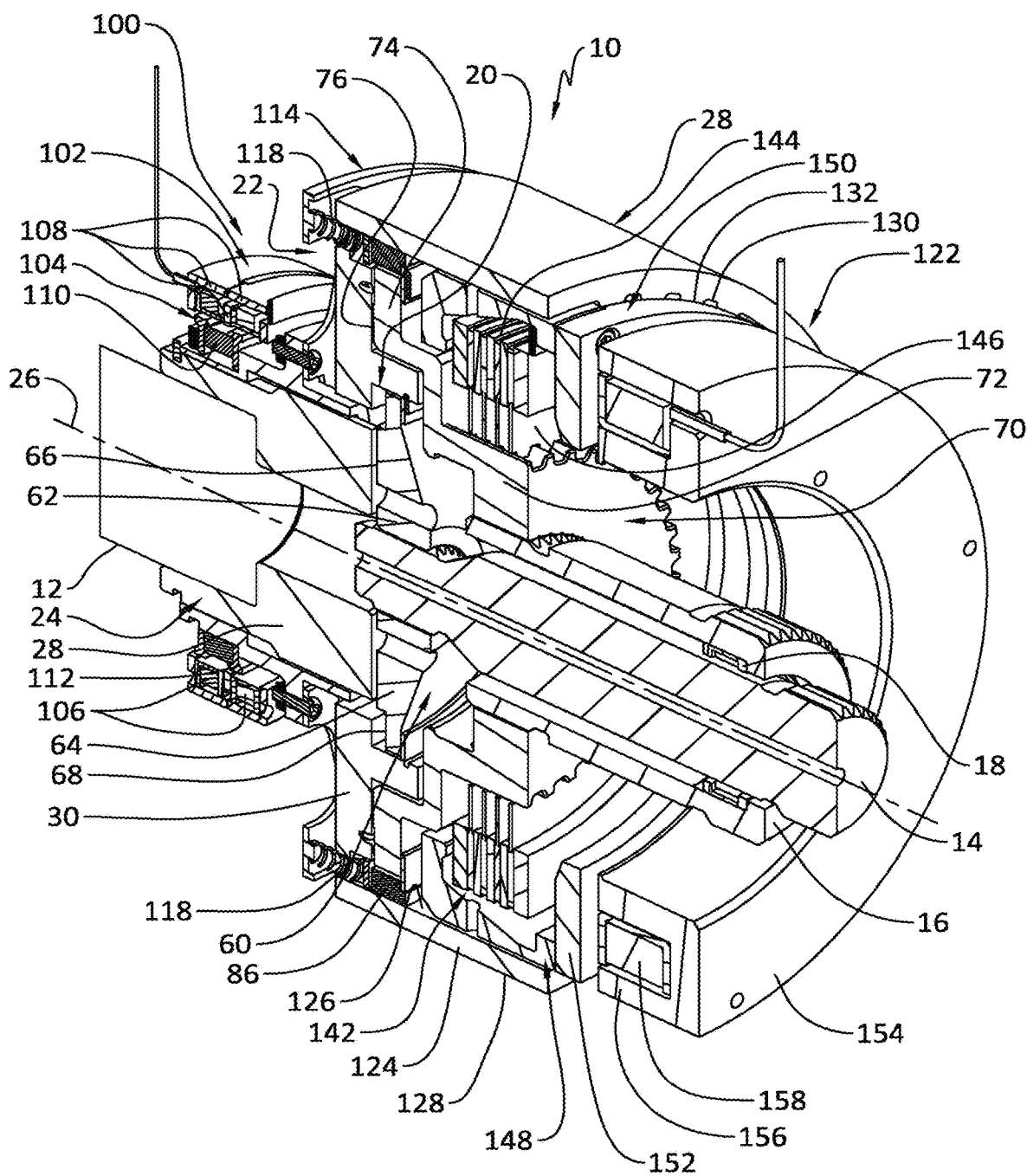
FIG. 1 is a sectional perspective view of a clutch assembly according to one example of the present invention.
Figure 2:
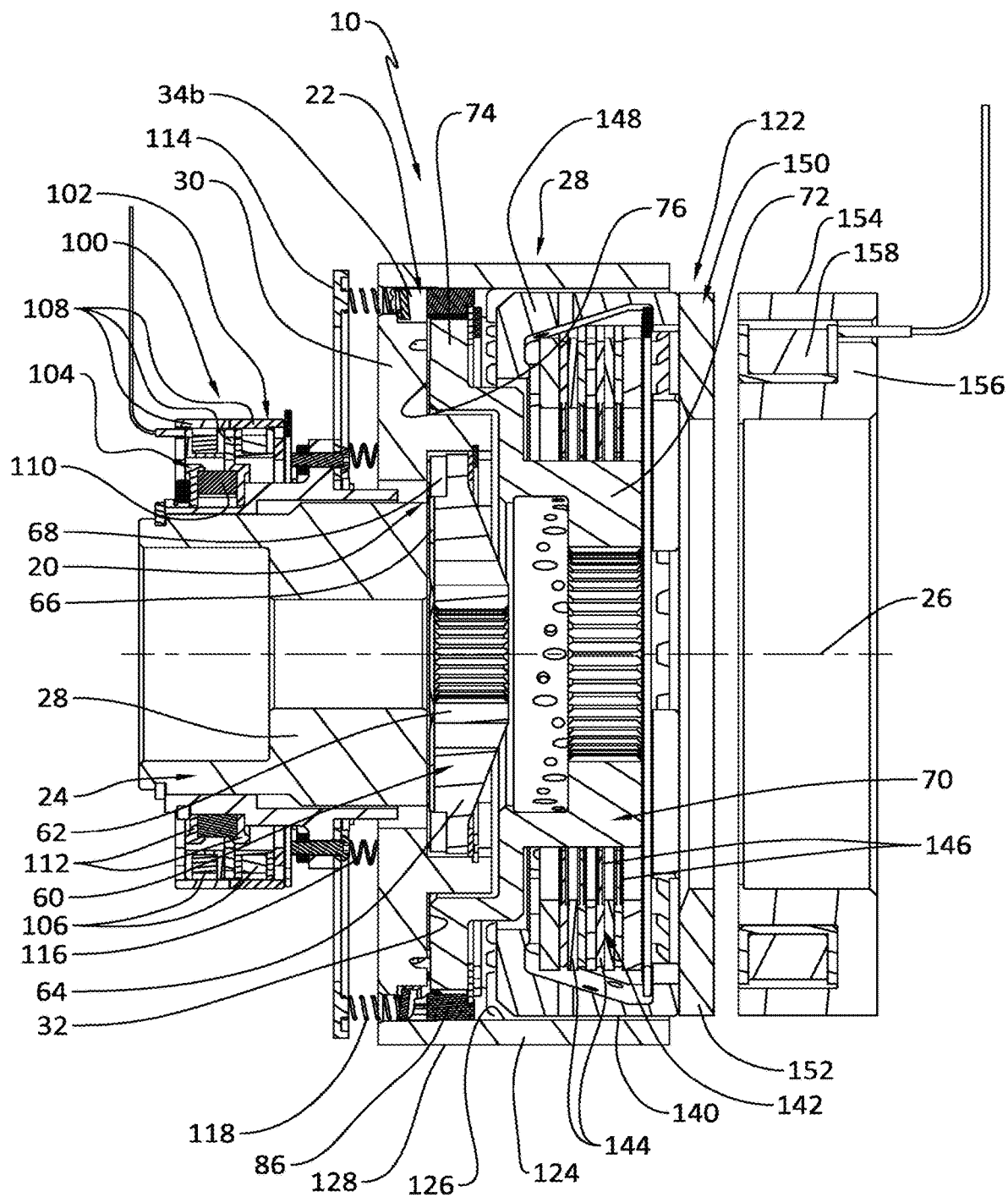
FIG. 2 is a sectional side view of the clutch assembly of FIG. 1
Figure 3:
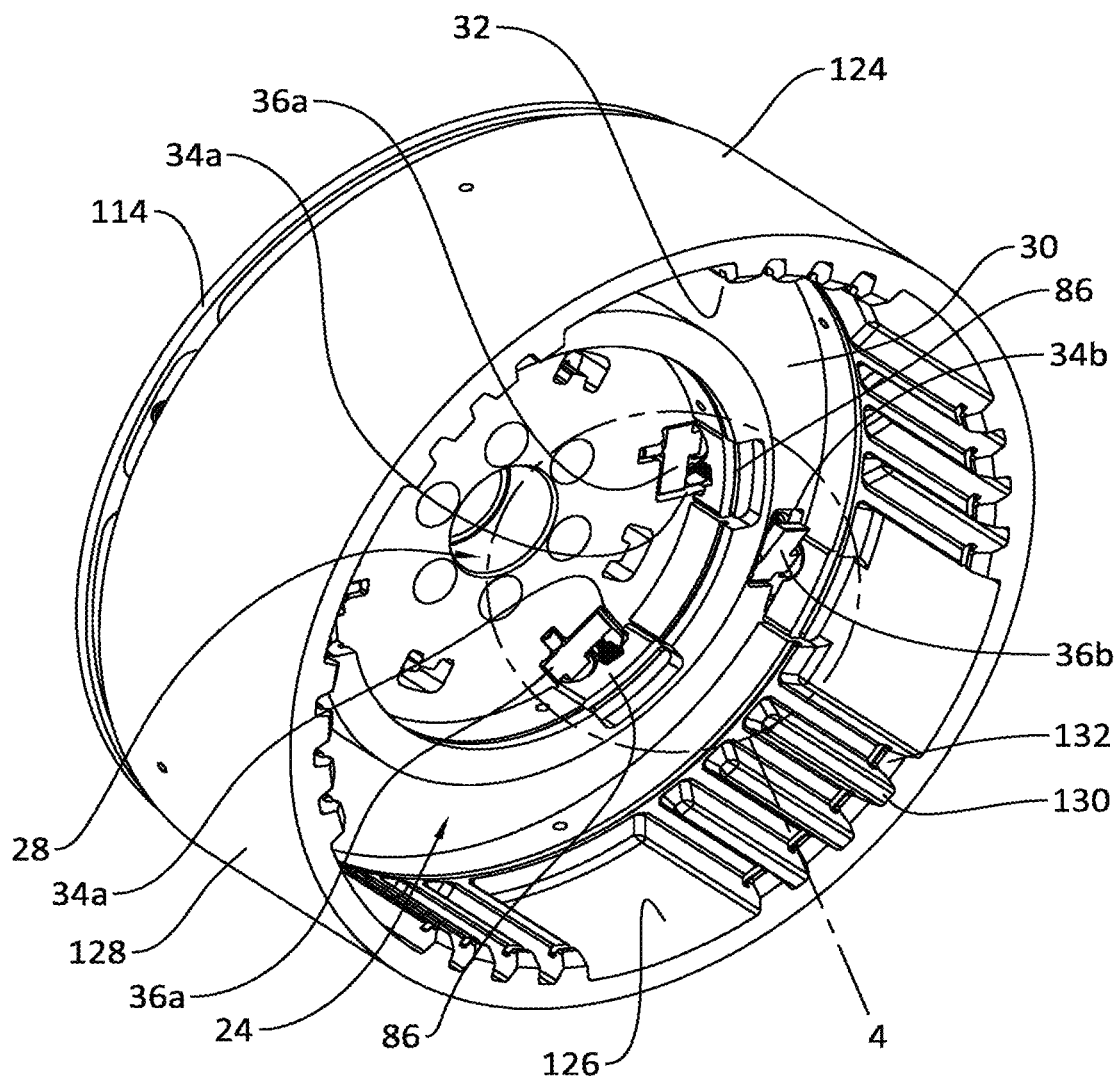
FIG. 3 is a perspective view of a component of the clutch assembly of FIG. 1.
Figure 4:
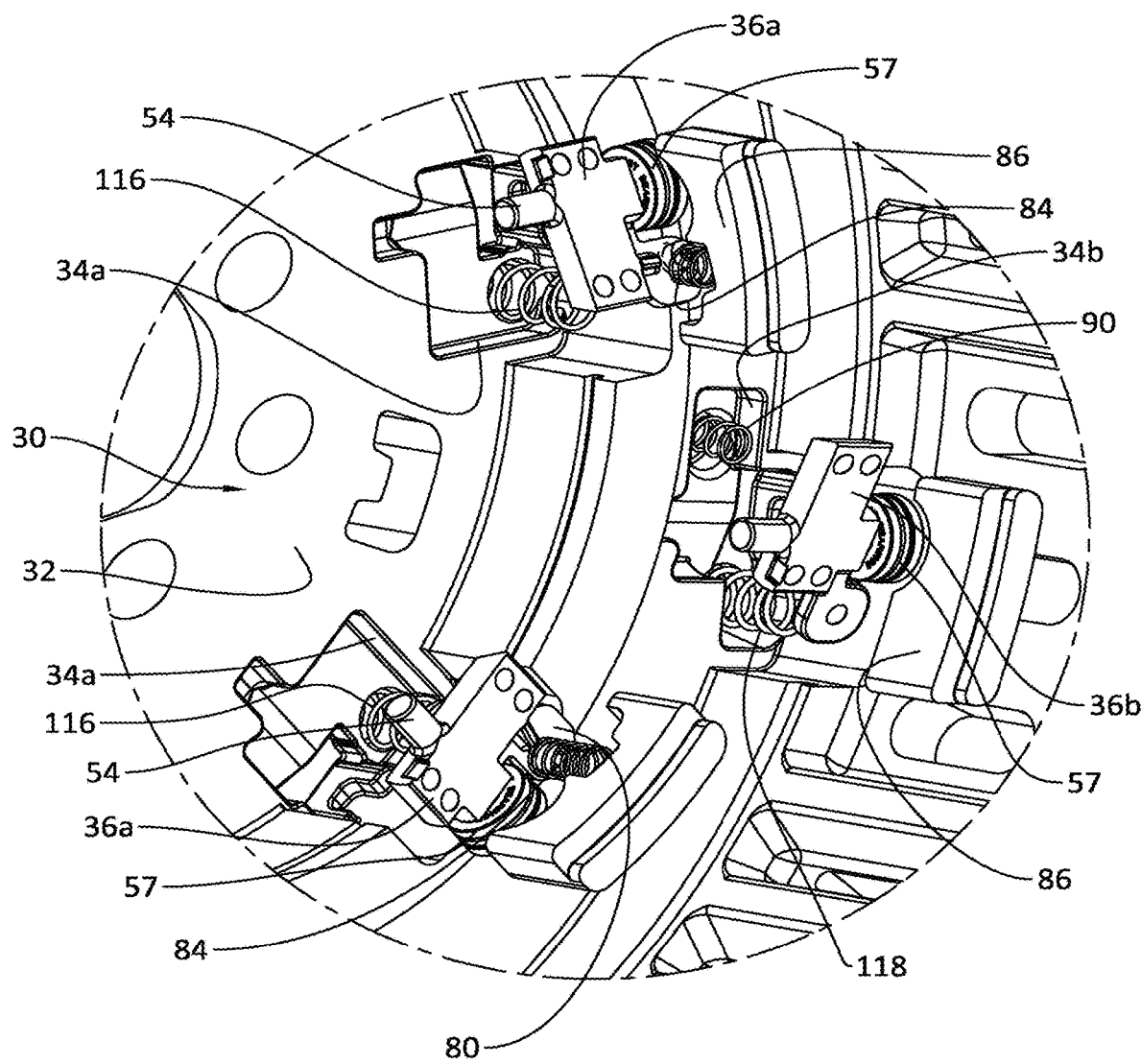
FIG. 4 is an enlarged perspective view of a part of the component of the clutch assembly of FIG. 3 shown in the area of circle 4.

The following description of the preferred embodiment(s) is merely exemplary in nature and is in no way intended to limit the invention, its application, or its uses.

FIGS. 1-4 illustrate a clutch assembly 10 in accordance with at least one embodiment of the present invention. The clutch assembly 10 functions as a torque transmitting mechanism that provides a mechanical engagement between mating parts. The clutch assembly 10 includes multiple one-way clutches. Examples of one-way clutches include, a include a passive one-way clutch and a selectable or controllable one-way clutch. A passive one-way clutch or passive strut assembly includes a passive or uncontrolled locking element, for example, a strut, disposed in the pocket of the pocket plate. A resilient member or spring continuously biases the strut outward of the pocket in the pocket plate; the strut is continuously deployed. The one-way clutch is passive because the strut is not controlled. A selectable or controllable one-way clutch is one wherein the state of the one-way clutch, activated or deactivated-deployed or nondeployed, can be selected or controlled. A selectable or controllable one-way clutch may also be referred to as an active one-way clutch. A selectable or controllable one-way clutch in a nondeployed condition allows overrun in both directions and functions like a passive one-way clutch when deployed. Hence, a selectable or controllable one-way clutch is active, the state of the locking element, deployed or nondeployed can be controlled, and passive in that the locking element, when deployed can be overrun. In one example, the one-way clutches are dynamically controllable clutches. A dynamic controllable clutch refers to a selectable or controllable one-way clutch acting between two rotating components; for example, both races are rotatable.

As shown in the drawings, the clutch assembly 10 includes an input shaft or member 12 and first and second output members, shown as inner and outer concentric shafts 14, 16 supported for relative rotation by a bearing 18. The clutch assembly 10 includes a first coupling assembly, seen generally at 20 and a second coupling assembly, seen generally at 22. The pocket plate may contain two locking elements—one for clockwise and the other for counterclockwise engagement. During engagement, at least one set of locking elements is controllably deployed such that each locking element in the set simultaneously contacts the pocket and notch engagement faces of the pocket and notch plates, respectively, which couples the two plates together to either transmit torque or ground torque, in the case of a brake.

The first coupling assembly 20 controllably couples the input shaft or member 12 and the first or inner output shaft or member 14 and transfers torque between the input shaft or member 12 and the first or inner output shaft or member 14. The second coupling assembly 22 controllably couples the input shaft or member 12 and the second or outer output shaft or member 16 and transfers torque between the input shaft or member 12 and the second or outer output shaft or member 16.

The first coupling assembly 20 includes an input component, seen generally at 24, connected to the input shaft or member 12. The input component 24 rotates with the input shaft or member 12 in either a clockwise or counterclockwise direction about a rotational axis 26 of the clutch assembly 10. In one example, the first component 24 includes a hub 28 and a radially extending disc-shaped or plate member 30 having a side surface 32. In one example, the side surface 32 extends radially and faces axially with respect to the rotational axis 26. The side surface 32 includes a plurality of openings, recesses, or pockets 34 communicating with the side surface 32. The input component 24 may be referred to as a pocket plate because it includes a plurality of pockets in a surface thereof. In one example, the side surface 32 of the disc-shaped or plate member 30 includes forward recesses or pockets and reverse recesses or pockets formed in the radially extending disc-shaped or plate member 30, wherein forward and reverse refer to a direction of vehicle movement.

As illustrated, the recesses or pockets 34 are arranged circumferentially about disc-shaped or plate member 30 relative to the rotation axis 26 in two concentric circles or rings, an inner ring of pockets 34a and an outer ring of pockets 34b. The outer ring of pockets 34b is radially spaced outward of the inner ring of pockets 34a, wherein the inner ring of pockets 34a is a part of the first coupling assembly 20, and the outer ring of pockets 34b is part of the second coupling assembly 22. Each pocket of the inner ring of pockets 34a includes a pocket shoulder 35a, a shoulder of the recess, and each pocket of the outer ring of pockets 34b includes a pocket shoulder 35b, a shoulder of the recess.

Each pocket 34 includes a locking member or strut, generally indicated at 36. The struts 36 and corresponding pockets 34 are configured differently depending on their respective positions, inner pockets 34a or outer pockets 34b, and the direction of torque transfer. In addition, the locking members or struts 36 are configured based on the direction of rotation.

FIGS. 8a-10b illustrate a locking member or strut 36 for use with the clutch assembly 10. In general, each locking member or strut 36 includes a first end surface 38 at a free or deployed end 40 of the strut 36 and a second end surface 42 at a shoulder-engaging end 44 of the strut 36 diametrically opposite the first end surface 38. The strut includes an upper face 46 and a lower face 48 interconnected by longitudinal side surfaces 50. An elongated main body portion 52 extends between the respective end surfaces 38, 42.

Each locking member or strut 36 also includes projecting inner and outer pivot pins or members 54, 56 extending laterally from the main body portion 52. The inner pivot pin 54 is closer to the rotational axis 26 when the locking member or strut 36 is positioned in the pocket 34. The pivot members 54, 56 enable pivotal motion of the locking member or strut 36 about a pivot axis 58 of the locking member or strut 36 intersecting the pivot members 54, 56. The pivot axis 58 extends transversely to a longitudinal axis of the main body portion 52 of the strut 36. The pivot axis 58 separates the free or deployed end 40 and the shoulder engaging end 44. The free or deployed end 40 lies on one side, and the shoulder engaging end 44 lies on the other side of the pivot axis 58. The first end surface 38 of the locking member or strut 36 pivots outward and extends above the side surface 32 of the disc-shaped or plate portion 30 in a deployed or engaged position. The locking member or strut 36 moves between an engaged position extending above the side surface of the disc-shaped or plate portion 30 and a disengaged position lying in the recess or pocket 34. One-way torque transfer occurs in the engaged position of the locking members or struts 36.

The first coupling assembly 20 includes inner struts 36a disposed in the inner pockets 34a. The outer pivot pin 58 is supported in a bearing 57 located between the inner component 24 and the retainer block or member 86. The inner struts 36a have a laterally extending projection or paddle portion 80 and an upright post or peg 82. A biasing or return member 84, for example, a spring on the post or peg 82, exerts an influence or a force between a retainer or block member 86, secured to the disc-shaped or plate portion 30 of the first component 24, and the paddle portion 80 to push and corresponding move the inner strut 36a into the pocket 34a. As illustrated, the laterally extending projection or paddle portion 80 is offset from the main body portion 52 of the strut 36a. It extends longitudinally beyond the first end surface 42 at the free or deployed end 40. The biasing or return member 84 is retained by and acts against the retainer block or member 86. The paddle portion 80 and the biasing or return member 84 are on the side of the free or deployed end 40 of the strut 36. They are between the pivot axis 58 and the free or deployed end 40. The inner component 24 includes struts 36a positioned opposite one another to transfer torque in both directions of rotation, clockwise and counterclockwise. The drawings, FIGS. 8*a*-8*b* and 9*a*-9*b* show that the struts 36*a* have a slightly modified configuration depending upon the direction of torque transfer, with the extending projection or paddle portion 80 on the radially outer side of the struts 36*a*, the side of the outer pivot pin 56. As shown, the laterally extending projection or paddle portion 80 extends radially outward from the main body portion 52 and remains under the retainer block or member 86. In the first position, the force of the biasing or return member 84 keeps the strut 36*a* in the pocket 34*a*. When the struts 36*a* remain in the inner pockets 34*a*, the struts 36*a* are not deployed, the input component 24 is not coupled to the first or inner output component 60, and no torque is transferred between the two components.

The second coupling assembly 22 includes outer struts 36*b* disposed in the outer pockets 34*b*. The outer pivot pin 58 is supported in a bearing 57 located between the inner component 24 and the retainer block or member 86. The outer struts 36*b* have a laterally and longitudinally extending projection or paddle portion 88. As illustrated, the laterally and longitudinally extending projection or paddle portion 88 is offset from the main body portion 52 of the strut 36*b*. It extends longitudinally beyond the second end surface 42 at the shoulder engaging end 44. A biasing or deploy member 90, for example, a spring, exerts an influence or force between the disc-shaped or plate portion 30 of the first component 24 and the lower face 48 of the strut 36. The biasing or deploy member 90 contacts the lower face 48 between the pivot axis 58 and the first and surface 38 at the free or deployed end 40. The biasing or deploy member 90 pushes or urges the outer strut 36*b* and correspondingly moves the outer strut 36*b* outward from the pocket 34*b* into a deployed position. As illustrated, the laterally extending projection or paddle portion 88 is laterally and longitudinally offset from main body portion 52 of the strut 36*b* and, along with the outer actuation member 118, the spring 118, is held and moves under a retainer block or member 86. As illustrated in the present example, the strut 36*b* transfers torque in one direction of rotation, for example, counterclockwise. A second outer strut 36*b* could be added to transfer torque in the second direction of rotation, for example, clockwise. Such an arrangement may look similar to the inner ring of pockets 34*a* and struts 36*a*. In the first position, the force of the biasing or deploy member 90 urges the strut 36*b* out of the pocket 34*b* and above the side surface 32 of the plate 30. Because the struts 36*b* extend out of the outer ring of pockets 34*b*, the input component 24 is coupled to the second or outer output component 70, and torque is transferred between the two components.

Figure 5:
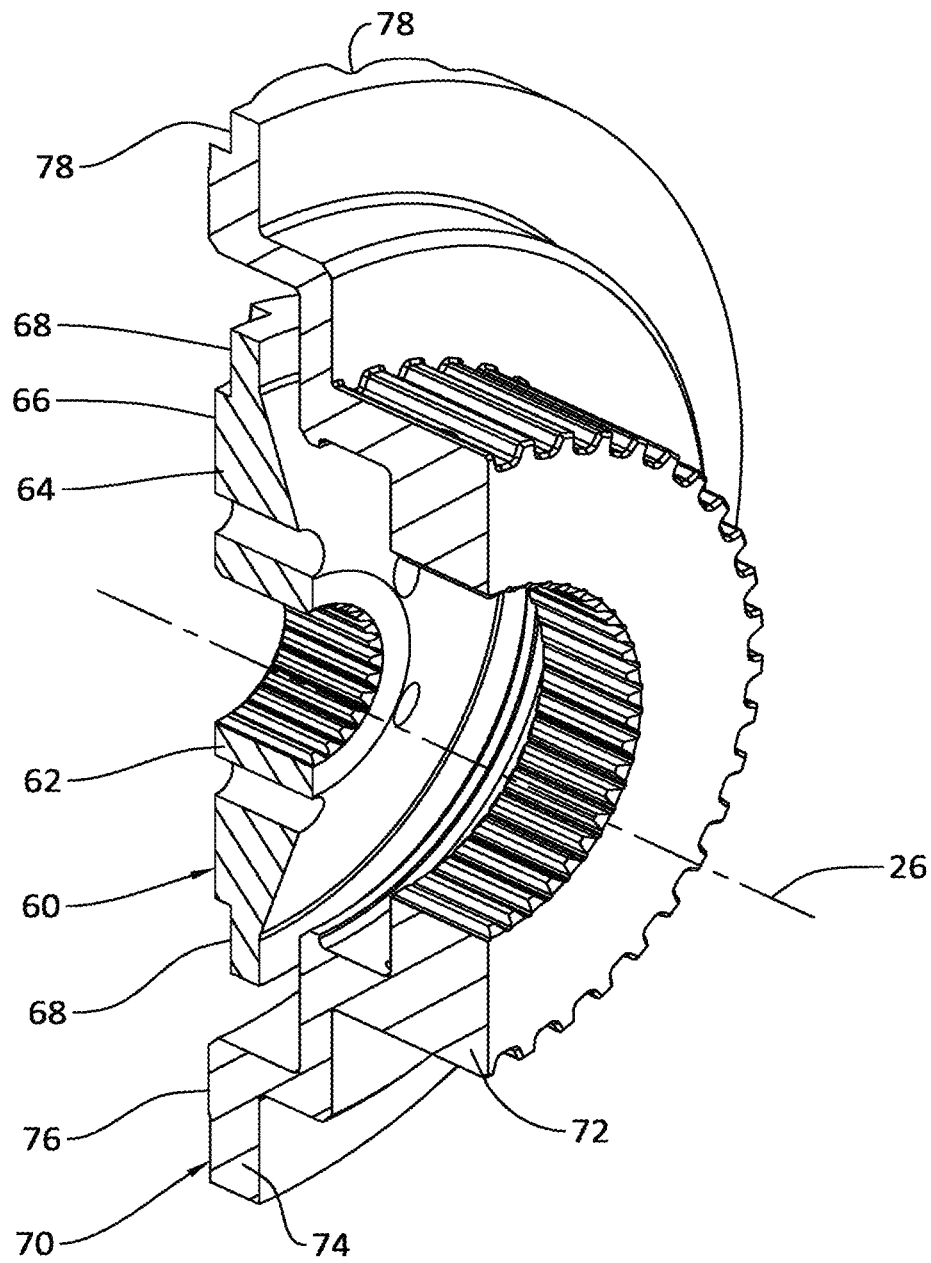
FIG. 5 is a perspective sectional view of a component of the clutch assembly of FIG. 1 taken from the right-hand side.
Figure 6:
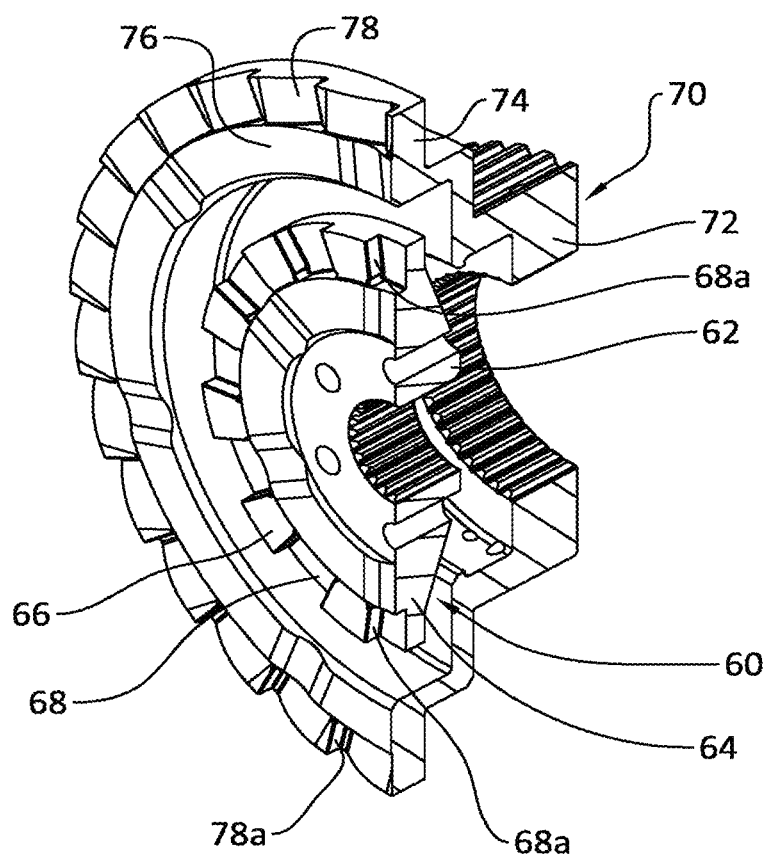
FIG. 6 is a perspective sectional view of a component of the clutch assembly of FIG. 1 taken from the left-hand side.
Figure 7:
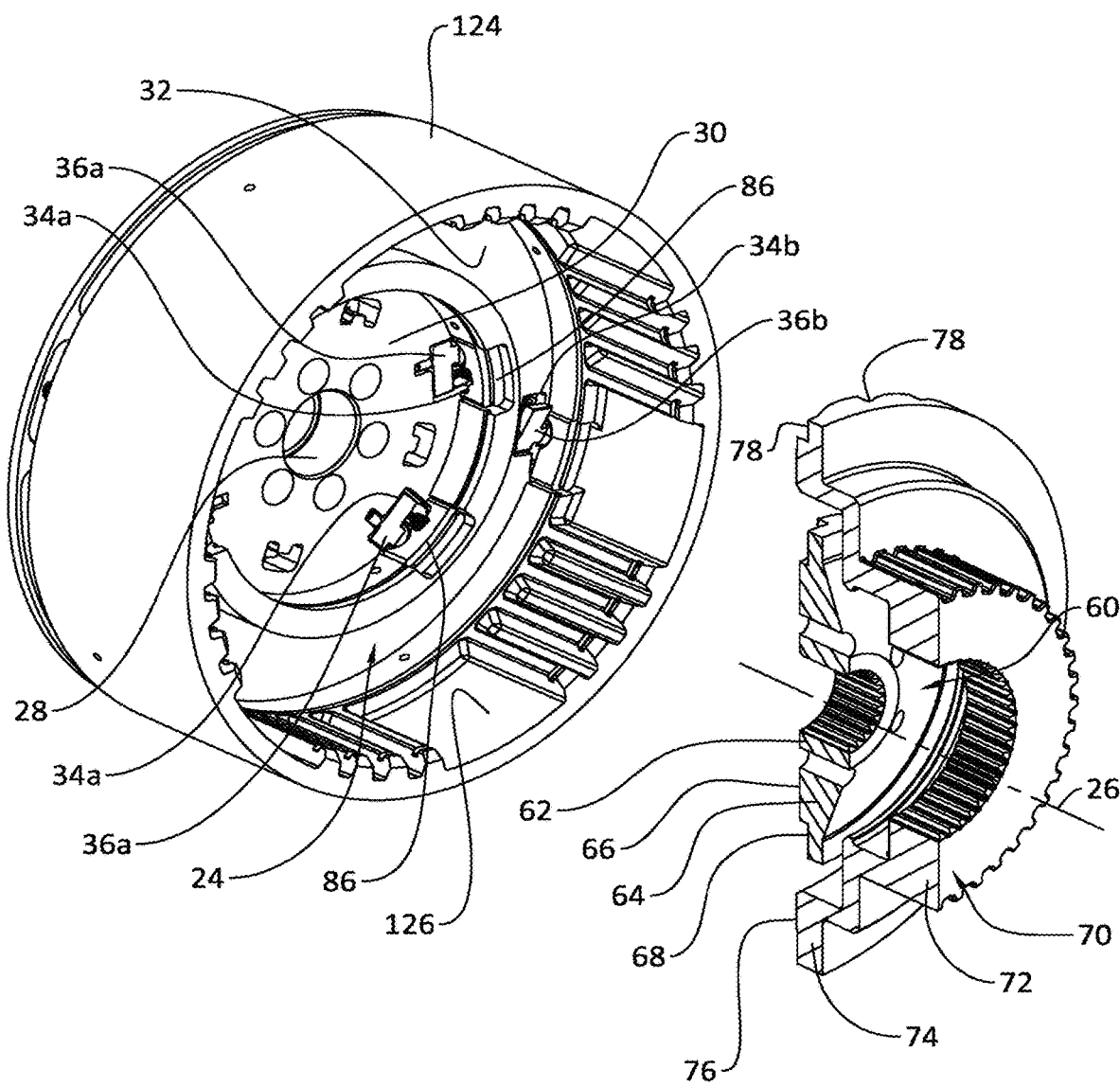
FIG. 7 is a perspective, partial sectional, exploded view of part of the clutch assembly of FIG. 1.
Figures 8A, 8B:
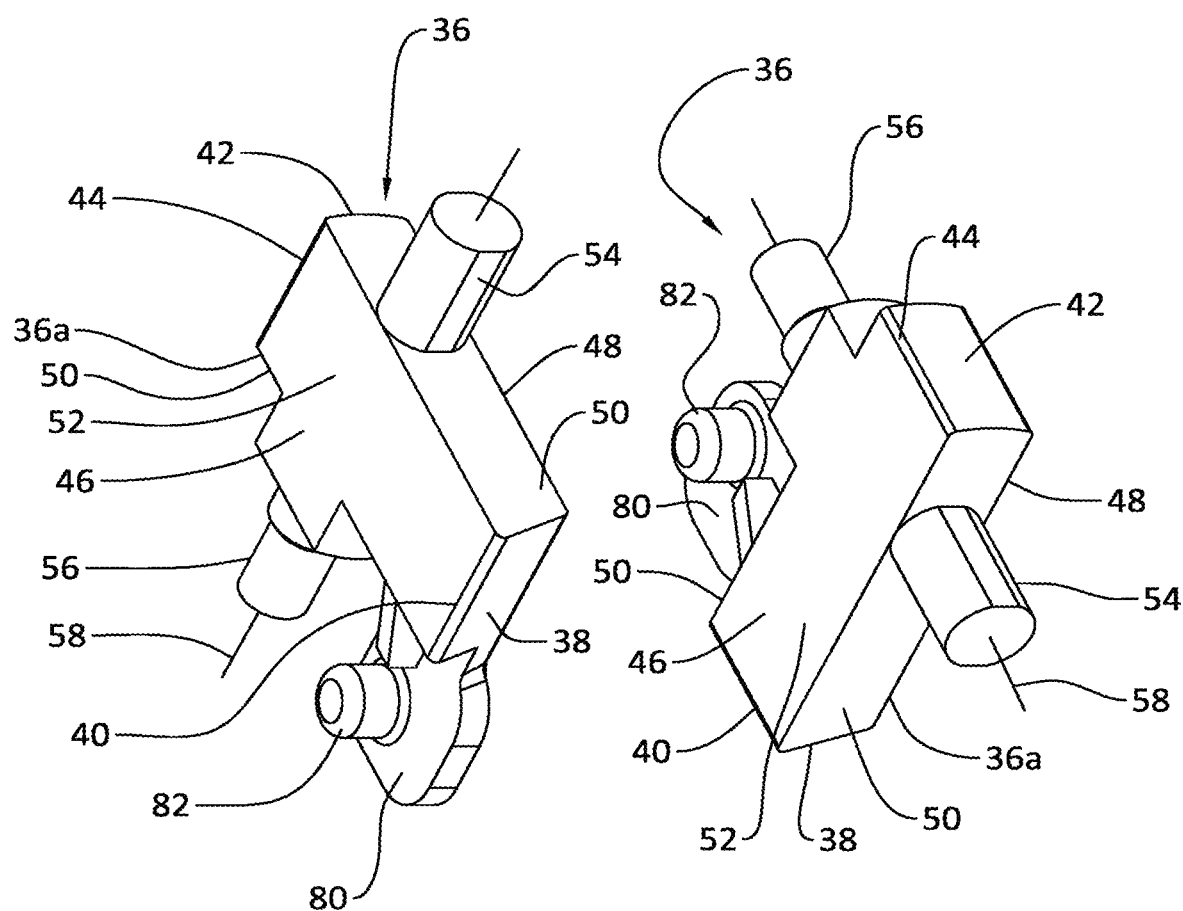
FIGS. 8a and 8b are perspective views of a component of the clutch assembly of FIG. 1.
Figures 9A, 9B:
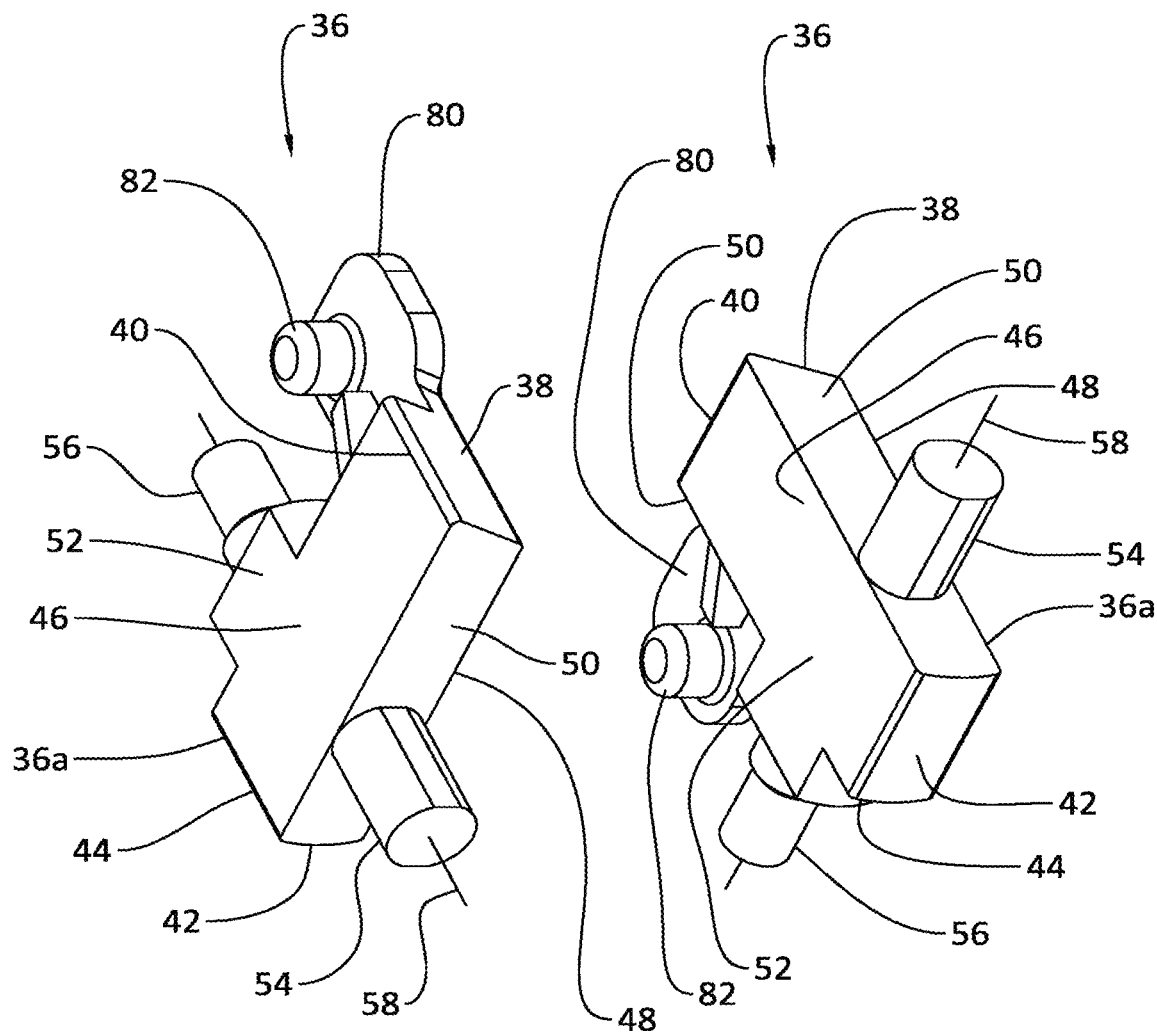
FIGS. 9a and 9b are perspective views of another component of the clutch assembly of FIG. 1.
Figures 10A, 10B:
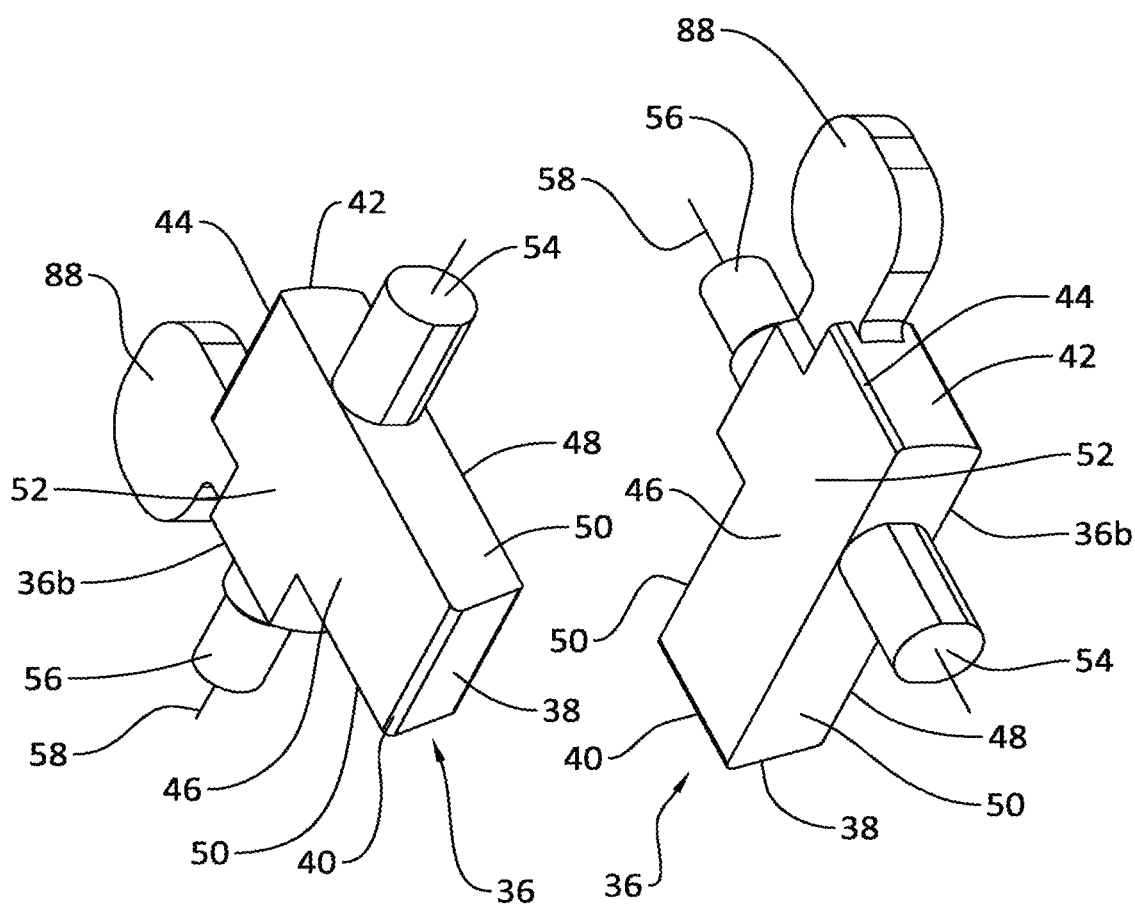
FIGS. 10a and 10b are perspective views of still another component of the clutch assembly of FIG. 1.

FIGS. 5-7 show the first or inner output component 60 of the first coupling assembly 20 connects to the first or inner output shaft or member 14. Wherein, the first or inner output component 60 rotates with the first or inner output shaft or member 14 in either a clockwise or counterclockwise direction about the rotational axis 26 of the clutch assembly 10. In one example, the first or inner output component 60 includes a hub 62 and a radially extending disc-shaped or plate member 64 having a side surface 66. In one example, the side surface 66 extends radially and faces axially with respect to the rotational axis 26. The first or inner output component 60 includes a plurality of recesses or notches 68 formed in the side surface 66 of the radially extending disc-shaped or plate member 64—each of the recesses or notches 68 includes an engagement end or surface 68*a*. The notches 68 are circumferentially spaced about the side surface 66. The first or inner output component 60 may be referred to as a notch plate, for example, the inner notch plate, because it includes a plurality of recesses or notches in an outer surface.

In the first coupling assembly 20, the side surface 66 of the radially extending disc-shaped or plate member 64 of the first or inner output component 60 is placed adjacent to the side surface 32 of the disc-shaped or plate portion 30 of the input component 24. The notches 68 line up with and correspond to the inner ring of pockets 34*a*, whereby deploying or extending the struts 36*a* above or past the side surface 32 of the disc-shaped or plate portion 30 of the input component 24 results in the struts 36*a* engaging the engagement ends or surfaces 68*a* the notches 68 in the side surface 66 of the radially extending disc-shaped or plate member 64 enabling torque transfer between the input component 24 and the first or inner output component 60. When the struts 36 are nondeployed, they remain in the pockets 34 and do not engage the engagement surfaces 68*a* of the notches 68 in the side surface 66 of the radially extending disc-shaped or plate member 64.

In a similar manner, the second coupling assembly 22 includes a second or outer output component 70 connected to the second or outer output shaft or member 16. The second or outer output component 70 rotates with the second or outer output shaft or member 16 in either a clockwise or counterclockwise direction about the rotational axis 26 of the clutch assembly 10. In one example, the second or outer output component 70 includes a hub 72 and a radially extending disc-shaped or plate member 74 having a side surface 76. In one example, the side surface 76 extends radially and faces axially with respect to the rotational axis 26. The second or outer output component 70 includes a plurality of recesses or notches 78 formed in the side surface 76 of the radially extending disc-shaped or plate member 74. Each of the recesses or notches 78 includes an engagement end or surface 78*a*. The notches 78 are circumferentially spaced about the side surface 76. The second or outer output component 70 may also be referred to as a notch plate, for example, the outer notch plate, because it includes a plurality of recesses or notches in an outer surface.

In the second coupling assembly 22, the side surface 76 of the radially extending disc-shaped or plate member 74 of the second or outer output component 70 is placed adjacent to the side surface 32 of the disc-shaped or plate portion 30 of the input component 24. The notches 78 line up with and correspond to the outer ring of pockets 34*b*, whereby deploying or extending the struts 36*b* above or past the side surface 32 of the disc-shaped or plate portion 30 of the input component 24 results in the struts 36 engaging the engagement end or surface 78*a* of the notches 78 in the side surface 76 of the radially extending disc-shaped or plate member 74 enabling torque transfer between the input component 24 and the second or outer output component 70. When the struts 36*b* are nondeployed, they remain in the pockets 34*b* and do not engage the notches 78 in the side surface 76 of the radially extending disc-shaped or plate member 74.

The clutch assembly 10 includes an actuation system or mechanism in the form of a linear motor or linear actuator 100. The linear actuator 100 includes a stator 102 and a translator 104. The stator 102 is fixed in position, for example, to a housing (not shown). The stator 102 includes a pair of copper wire induction coils 106. Steel plates 108 house for the stator induction coils 106. The stator coils 106 are wound in series with reversed polarity relative to one another, anti-series.

The translator 104 includes an annular ring of segmented permanent magnets 110 and steel plates 112. The translator 104 connects to and rotates with the input member 12 and moves linearly between lateral, axial positions. The linear actuator 100 actively controls an operating mode of the clutch assembly 10 by generating an electromagnetic force with the stator 102 that interacts with the translator 104, causing the translator to slide axially and move reciprocally in an axial direction on the input component 24. The linear actuator 100 is a two-position actuator, with the stator 102 having a pair of induction coils 106. Multiple-position actuators, for example, a three or four-position actuator, may also be used.

In one example, the linear actuator 100 includes a radially extending actuation plate 114. The actuation plate 114 includes inner and outer actuation members 116, 118. In the disclosed example, the inner actuation member 116 is associated with the first coupling assembly 20, and the outer actuation member 118 is associated with the second coupling assembly 22. Axial movement of the translator 104 and correspondingly the actuation plate 114 applies a force to the actuation members 116, 118 wherein the members 116, 118 act on the struts 36a, 36b. In one example, the actuation members are coiled springs, received within the passages 120a, 120b to provide an actuating force to move the struts 36a, 36b between their engaged, deployed, and disengaged, nondeployed positions. Other actuators besides springs may provide the actuating forces. Also, pressurized fluid may provide the actuating forces.

Figure 11:
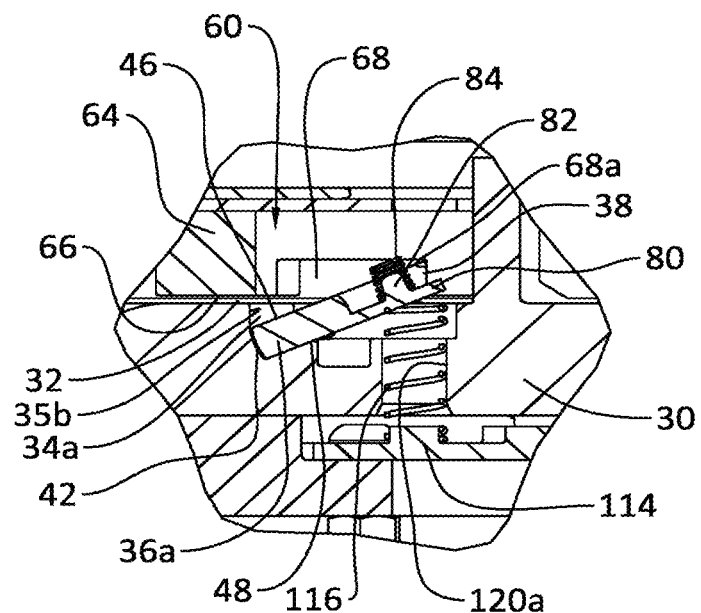
FIG. 11 is a sectional view of one aspect of the clutch assembly of FIG. 1 in the first position.
Figure 12:
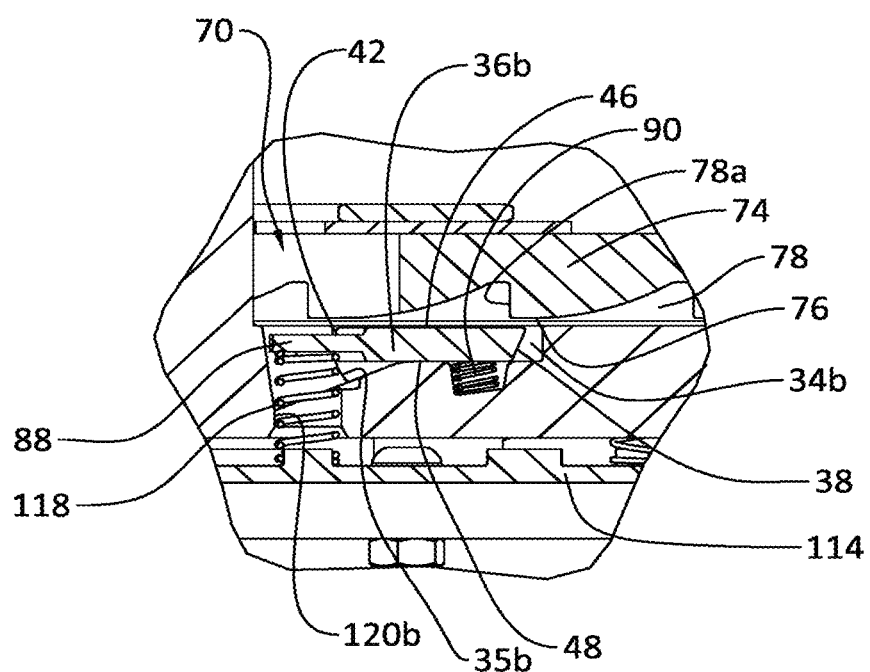
FIG. 12 is a sectional view of another aspect of the clutch assembly of FIG. 1 in the first position.
Figure 13:
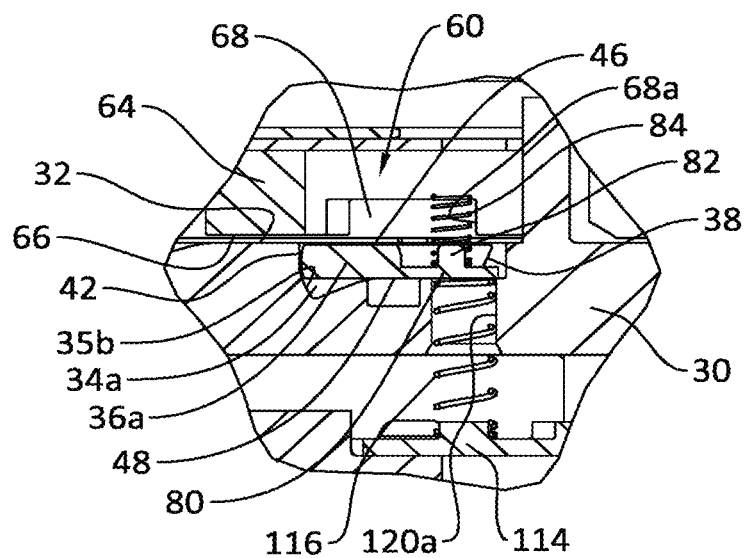
FIG. 13 is a sectional view showing the aspect of the clutch assembly of FIG. 11 in the second position.
Figure 14:
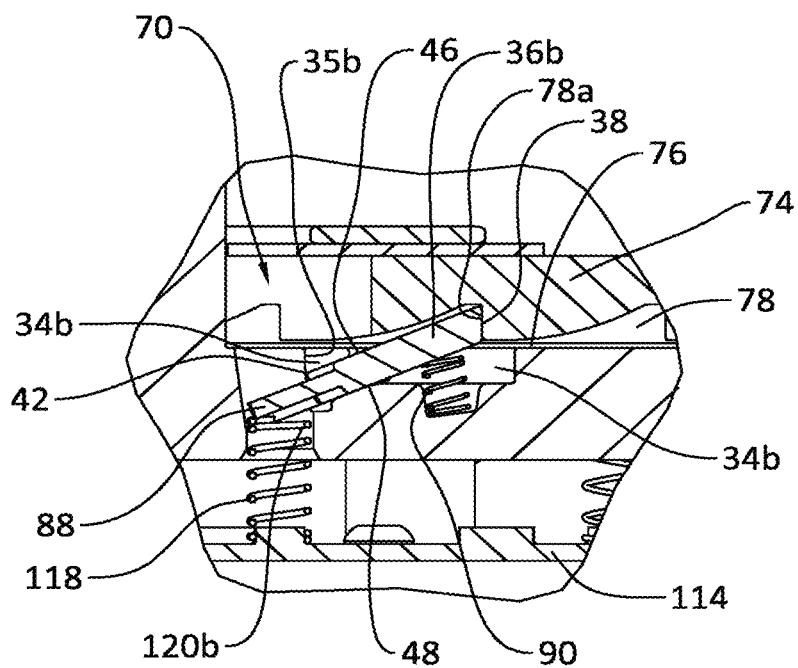
FIG. 14 is a sectional view showing the aspect of the clutch assembly of FIG. 12 in the second position.

The linear actuator 100, through the translator 104, moves the actuation plate 114 between the first and second positions. FIGS. 11-12 illustrate the first position of the actuation plate 114 and the position of the corresponding inner and outer struts 36a, 36b. FIGS. 13-14 illustrates the second position of the actuation plate 114 and the position of the corresponding inner and outer struts 36a, 36bb. s illustrated, movement of the actuation plate 114 from the first position to the second position, from the position shown in FIGS. 11-12 to that shown in FIGS. 13-14, causes the outer actuation member 118 to act on one end of the strut 36b, overcome the force of the biasing or deploy member 90, and pivot the strut 36b inward into the pocket 34b, placing the strut 36b in a nondeployed or nonengaged position. Correspondingly, movement of the actuation plate 114 from the first position to the second position causes the inner actuation member 116 to act on one end of the strut 36a, overcome the force of the biasing or return member 84, and pivot the strut 36a outward out of the pocket 34a placing the strut 36a in a deployed or engaged position.

As illustrated, in the first position, the interior or inner set of struts 36a in the inner ring of pockets 34s are or remain in the pockets 34, and the outer set of struts 36b are deployed, extended outwardly from the pockets 34 of the outer ring of pockets 34b and engage the second or outer output component 70. In the first position, the actuation members 116, 118, attached to the actuation plate 114, do not act on their respective struts 36a, 36b. The biasing or return member 84 acts on the inner struts 36a, keeping them in the pockets 34a, in a nondeployed and disengaged position, wherein the struts 36a do not engage the first or inner output component 60 and no torque is transferred between the inner component 24 and the first or inner output component 60. Regarding the outer set of struts 36b, the biasing or deploy member 90 acts on the strut 36b to urge the strut 36b outward into a deployed, engaged position wherein the strut 36b engages the second or outer output component 70, and torque is transferred between the inner component 24 and the second or outer output component 70.

When the translator 104 moves to the second position, closer to the hub 28 of the inner component 24, the force applied by the inner and outer springs or actuation members 116, 118 acts on each of the inner and outer struts 36a, 36b. The inner actuation member 116 acts on the inner strut 36a, pivoting it outward into a deployed, engaged position with the first or inner output component 60 wherein torque is transferred between the input component 24 and the first or inner output component 60. The outer actuation member 118 acts on the outer strut 36b, pivoting it inward into a nondeployed, disengaged position in the pocket 34b wherein no torque is transferred between the input component 24 and the second or outer output component 70. Moving the actuation plate 114 to the second position disengages the outer struts 36b and engages the inner struts 36a. Depending on the position of the linear actuator 100 and corresponding translator 104, torque is transferred from the input component 24 to either the first or inner output component 60 or the second or outer output component 70, thereby transmitting torque from the input member 12 to one of the inner and outer output members 14, 16.

In one example, the clutch assembly 10 is a mechanism for coupling an input member 12 through a common input component 24 to at least one of two output members 14 using two output components 60, 70. The torque supplied by the input member 12 may be transferred to at least one of the two output members 14, 16 separately using a single two-position linear motor or actuator 100. While the present example discloses coupling the input member 14 to the first and second output members 14, 16 separately, the strut structure of the second coupling assembly 22 could be replaced with the strut structure of the first coupling assembly 20 wherein independent actuation of one of the first and second coupling assemblies 20, 22 deploys the associated set of struts to engage or couple the input component 24 with one of the corresponding inner and outer output components 60, 70. Depending upon the coupling assembly selected, each inner and outer output member 14, 16 can rotate in both directions, clockwise and counterclockwise, with the input member 12.

The actuation plate 114 moves axially between a first and second position, with the second position being closer to the input component 24, wherein the clutch assembly 10 provides a mechanism for independently driving the inner and outer output members 14, 16 from a single input member based on the position of the actuator 100. For example, the input member 12 drives one of the inner and outer output members 14, 16, while the other member rotates freely or overruns. In one example, the linear motor or actuator 100 functions as a two-position actuator. In the first position torque is transferred from the input component 24 to the second or outer output component 70, but not the first or inner output component 60. In the second position torque is transferred from the input component 24 to the first or inner output component 60, but not the second or outer component 70. In another example, a three-position actuator could be used. Changing the inner and outer actuation member 116, 118 length or, if using an actuation spring, the spring constant, provides a third clutch assembly position. For example, a three-position actuator provides an intermediary or neutral position wherein neither strut 36a, 36b is deployed or engaged.

The clutch assembly 10 transmits torque between the power flow components connected via the first and second coupling assemblies 20, 22. The direction of rotation and torque transmitted to the inner and outer output members 14, 16 can be used in various ways. For example, each of the inner and outer output members 14, 16 can supply or transmit power to various components such as a forward gear set, a reverse gear set, a front-wheel drive, a rear-wheel drive, a lower range, and a high range gearset.

In one example, as shown in FIGS. 15-18, the foregoing clutch assembly 10 can be used with an electromagnetic friction clutch (EFC) 122 to synchronize the rotation speed and direction of the input member 12 and the second or outer output member 16. The input component 24, connected to the input member 12, includes a cup-shaped body having a cylindrical drum portion 124 connected to the disc-shaped or plate portion 30. The cylindrical drum portion 124 extends longitudinally in the direction of the rotational axis 26.

The cylindrical drum portion 124 includes an inner peripheral surface 126 and an outer peripheral surface 128. The inner peripheral surface 126 has a plurality of alternating grooves 130 and projections 132, forming splines that mesh with corresponding grooves and projections in an outer peripheral surface 140 of the EFC 122, enabling torque transfer between the input component 24 and the EFC 122.

The EFC 122 uses friction members and includes a friction pack 142 having input friction plates 144 connected to the drum portion 124 and output friction plates 146 connected to the second or outer output component 70. An EFC translator 148 has a translator piston 150, a translator plate 152, and a stator 154 with a stator core 156 and a stator coil 158. The EFC stator 154 is fixed in position, and the EFC translator 148 is movable relative thereto. Movement of the EFC translator 148 toward the EFC stator 154 compresses the friction plates 144, 146 of the friction pack 142.

The friction pack 142 comprises a combination of friction plates 144, 146 that slide axially through inner splines and outer splines. When the plates 144, 146 are compressed, the friction between the plates 144, 146 carries torque, and the second or outer output component 70 rotates with the input component 24.

The EFC operates to synchronize the speed or angular velocity of the input component 24 and the second or outer output component 70. During the speed synchronization operation, the EFC translator 148 exerts a force on the friction pack 142, compressing together the inner and outer friction plates 144, 146 of the friction pack 142. The EFC friction pack 142 carries the dynamic torque between input component 24 and the second or outer output component 70 during the speed synchronization operation.

When the rotational speed or angular velocity of the input component 24 and the second or outer output component 70 are synchronized, they will rotate with or at virtually the same angular velocity. Once the input component 24 and the second or outer put component 70 are synchronized, the struts 36b of the input component 24 are actuated and engage the outer ring of pockets 34b. The engaged struts 36b couple the pocket plate or input component 24 and the notch plate or second or outer output component 70 and transmit torque between the input member 12 and second or outer output member 16 via the engaged pocket plate or input component 24 and the notch plate or second or outer output component 70.

As the first and second coupling assemblies 20, 22, and the EFC 122 are electromagnetically actuated, the clutch assembly 10 is a fully electromagnetic actuation clutching system. The clutch assembly 10 is electromagnetic and does not depend on a hydraulic actuator. An all-electric system, not dependent on hydraulic actuation, can be smaller, lighter, cleaner, and faster in response time. The clutch assembly 10 is engageable at high differential speeds using the EFC 122; capable of delivering high static torque using the first and second coupling assemblies 20, 22; controllable and can thus provide a linear response for dynamic torque using electric current modulation. The first and second coupling assemblies 20, 22 do not require a continuous supply of electric power to stay engaged for torque delivery since the steady-state engagement can be made possible by a magnetic or mechanical latching mechanism.

While the clutch assembly 10 utilizes an EFC 122 to synchronize speed between the input component 24 and the second or outer output component 70, a similar arrangement may also synchronize speed between the input component 24 and the first inner output component 60. In addition, other speed synchronization systems, such as (insert different systems) may also be used.

FIGS. 15-18 illustrate a power or torque path through the clutch assembly 10 based on the positions of the translator 104 of the linear actuator 100 of the first and second coupling assemblies 20, 22, and the translator of the 148 of the EFC 122. As shown in the drawings, the power or torque path changes depending upon the positions of the respective translators 104, 148.

Figure 15:
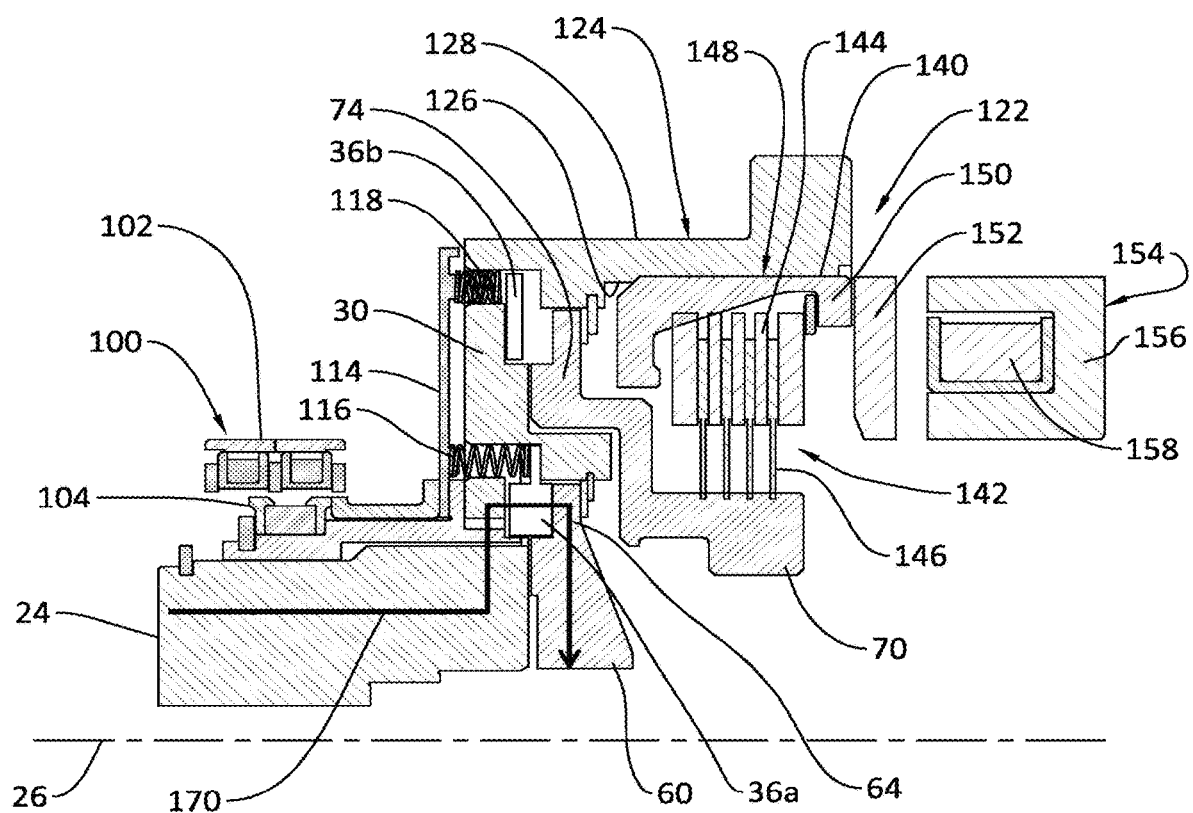
FIG. 15 is a schematic side view illustrating torque transmission and a power flow path through the clutch assembly of FIG. 1.

FIG. 15 illustrates the power or torque path between the input component 24 and the first and second output components 60, 70 with both the linear actuator 100 and EFC in the first position. In the first position, the translator 104 of the linear actuator 100 and the actuation plate 114 are in the far-right position, with the actuation plate 114 closer to the disc-shaped or plate portion 30. In the first position, the translator 148 of the EFC 122 is in the far-left position, wherein friction plates are in an uncompressed position, they carry no torque. With the linear actuator 100 in the first position, the struts 36a of the first coupling assembly 20 are deployed, and the struts 36b of the second coupling assembly 22 are nondeployed. In the first position, the first coupling assembly 20 carries torque through the deployed struts 36a from the input component 24 to the first or inner output component 60, as shown by the heavy, solid line 170. As illustrated, torque is transmitted directly from the input member 12 to the first or inner output member 14, a direct drive.

Figure 16:
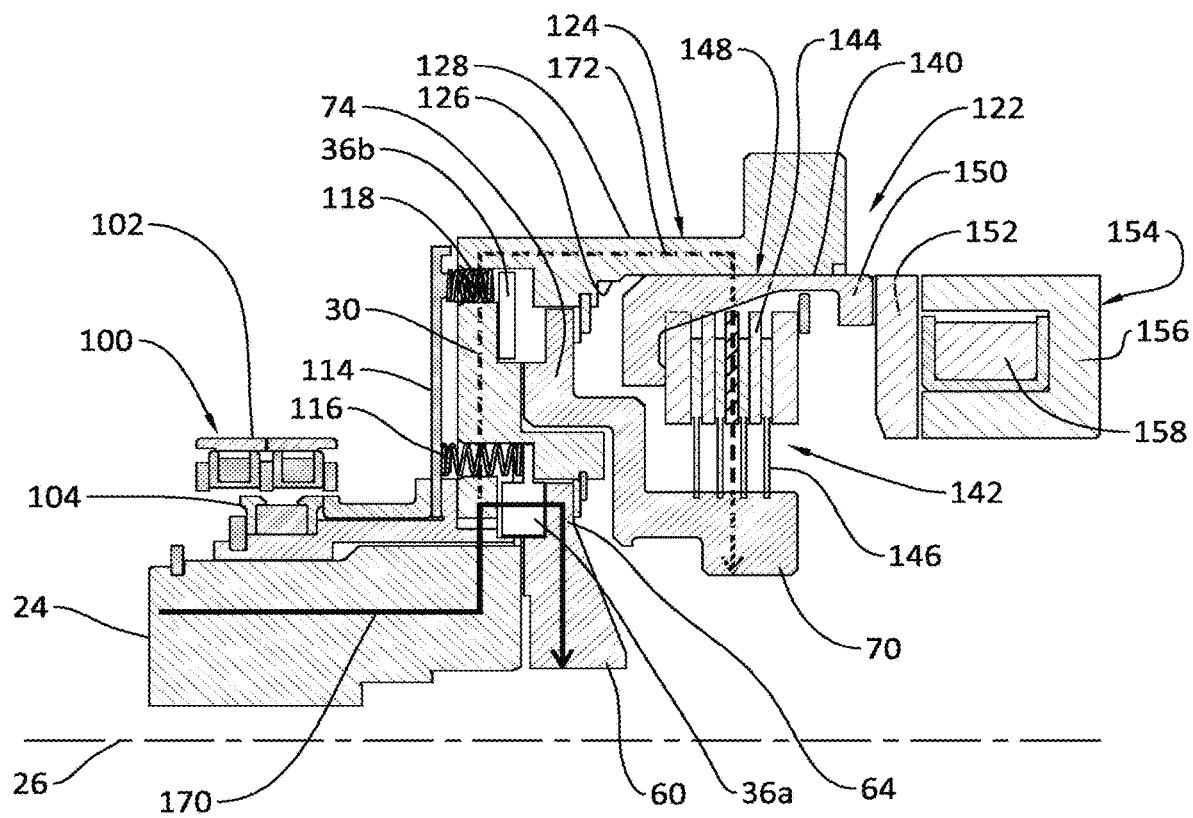
FIG. 16 is a schematic side view illustrating torque transmission and another power flow path through the clutch assembly of FIG. 1.

FIG. 16 illustrates the power or torque path between the input component 24 and the first and second output components 60, 70, with the linear actuator 100 in the first position and the EFC 122 in the second position. In the second position, the EFC translator 148 moves to the far-right position, with the translator plate 152 adjacent the stator 154. In the far-right position the EFC translator 148 compresses the friction pack 142 wherein the EFC 122 transmits torque from the input component 24 to the second or outer output component 70, as shown by the heavy dashed line 172. When the EFC is actuated, torque is transmitted to the second or outer output component 70, and the second or outer output component 70 starts to rotate.

Figure 17:
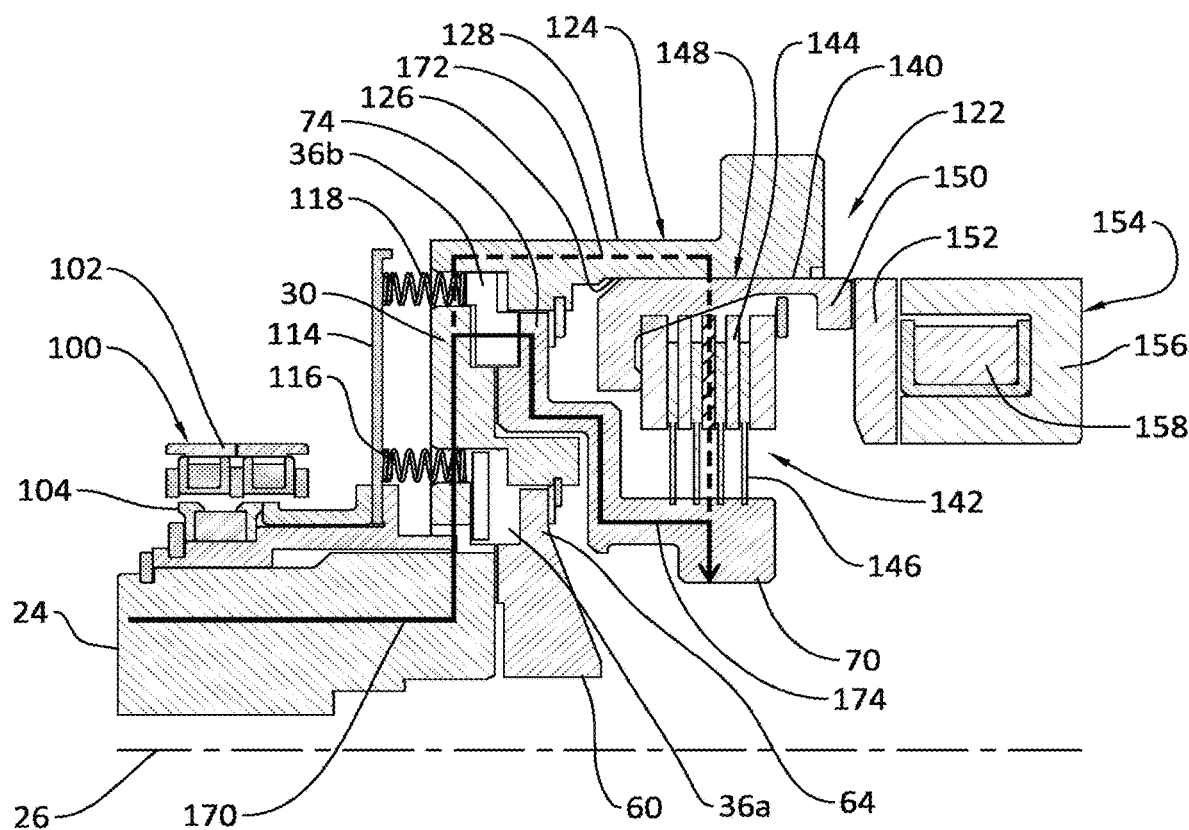
FIG. 17 is a schematic side view illustrating torque transmission and a further power flow path through the clutch assembly of FIG. 1.

FIG. 17 illustrates the power or torque path between the input component 24 and the first and second output components 60, 70 with the linear actuator 100 in the second position and the EFC 122 in the second position. In the second position, the translator 104 and the actuation plate 114 of the linear actuator 100 are in the left position, with the actuation plate 114 farther from the disc-shaped or plate portion 30. With the linear actuator 100 in the second position, the struts 36a of the first coupling assembly 20 are nondeployed, and the struts 36b of the second coupling assembly 22 are deployed. In the second position, the second coupling assembly 22 carries torque through the deployed struts 36b from the input component 24 to the second or outer output component 70, as shown by the heavy solid line 174. Because the EFC 122 is still actuated, torque is still transmitted to the second or outer output component 70 through the EFC 122, as shown by the heavy dashed line 172.

Figure 18:
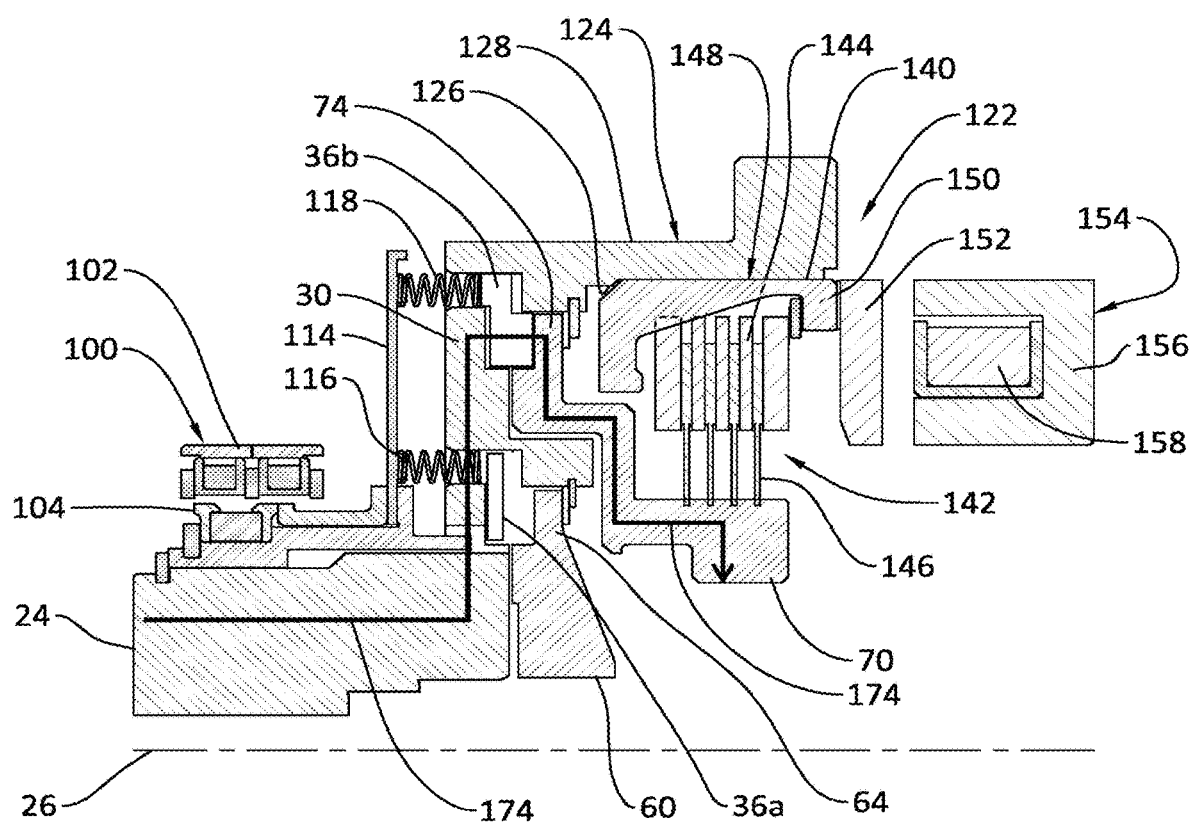
FIG. 18 is a schematic side view illustrating torque transmission and still another power flow through the clutch assembly of FIG. 1.

FIG. 18 illustrates the power or torque path between the input component 24 and the first and second output components 60, 70, with the linear actuator 100 in the second position and the EFC 122 in the first position. In the second position, the second coupling assembly 22 carries torque through the deployed struts 36*b* from the input component 24 to the second or outer output component 70, as shown by the heavy solid line 174. In the first position, the friction pack 142 of the EFC 122 is in the far-left uncompressed position and carries no torque. The only power or torque path extends from the input component 24 to the second or outer output component 70, shown by the heavy solid line 174.

In one example, the EFC 122 is used as a synchronization mechanism to synchronize the rotational speed of the second or outer output component 70 with that of the input component 24 prior to moving the linear actuator 100 to the second position.

The description of the invention is merely exemplary. Thus, variations that do not depart from the gist of the invention are intended to be within the scope of the invention. Such variations are not to be regarded as a departure from the spirit and scope of the invention.

What is claimed is:

1. A clutch assembly for use with a vehicle drive system comprising:
an input member;
a first output member;
a second output member;
an input component connected to the input member;
a first output component connected to the first output member;
a second output component connected to the second output member;
the input component, including a plurality of recesses arranged circumferentially on the input component in two concentric rings, an inner ring and an outer ring wherein the outer ring is radially spaced outward of the inner ring;
a first coupling assembly selectively coupling the input component to the first output component connected to the first output member;
a second coupling assembly selectively coupling the input member to the second output component connected to the second output member; and
an actuation mechanism movable between a first position and a second position wherein in the first position, the first coupling assembly decouples the input member and the first output member and couples the input member and the second output member, and in the second position, the second coupling assembly decouples the input member and the second output member and couples the input member and the first output member.

2. The clutch assembly of claim 1 wherein:
the first coupling assembly includes the inner ring of recesses; and
the second coupling assembly includes the outer ring of recesses.

3. The clutch assembly of claim 1 wherein:
the first output component having a surface, the surface including a plurality of recesses; and
the second output component having a surface, the surface including a plurality of recesses.

4. The clutch assembly of claim 3 wherein:
the first coupling assembly includes a locking member, the locking member in a recess in the inner ring of recesses, the locking member movable between a deployed and nondeployed position; and
the second coupling assembly includes a locking member, the locking member in a recess in the outer ring of recesses, the locking member movable between a deployed and a nondeployed position.

5. The clutch assembly of claim 4 including:
the locking member of the first coupling assembly having a pivot axis; and
the first coupling assembly includes an actuation member and a return member wherein both the actuation member and return member act on the locking member on the same side of the pivot axis.

6. The clutch assembly of claim 5 including:
the locking member of the second coupling assembly having a pivot axis; and
the second coupling assembly includes an actuation member and a return member wherein the actuation member and return member act on the locking member on opposite sides of the pivot axis.

7. A clutch assembly for use with a vehicle drive system comprising:
an input component rotatable about a longitudinal axis, the input component including a plurality of recesses;
a first output component rotatable about the longitudinal axis, the first output component including a plurality of recesses;
a second output component rotatable about the longitudinal axis, the second output component including a plurality of recesses;
a first set of locking members, each locking member of the first set having a first end, a second end, pivot members extending transversely to a longitudinal axis of the locking member and defining a pivot axis, the pivot axis disposed between the first and second end, with the locking member pivoting about the pivot axis, and a laterally extending projection at the first end of the locking member;
a second set of locking members, each locking member of the second set having a first end, a second end, pivot members extending transversely to a longitudinal axis of the locking member and defining a pivot axis, the pivot axis disposed between the first and second end, with the locking member pivoting about the pivot axis, and having a laterally extending projection at the second end of the locking member; and
an actuation mechanism movable between a first position and a second position, in the first position, the first set of locking members are nondeployed, decoupling the input component and the first output component and the second set of locking members are deployed, coupling the input component and the second output component, and in the second position, the first set of locking members are deployed, coupling the input component and the second output component and the second set of locking members are nondeployed, decoupling the input component and the first output component.

8. The clutch assembly of claim 7 wherein:
the input component includes a radially extending and axially facing surface, with the recesses of the input component arranged on the surface in concentric circles, the concentric circles arranged in an inner ring and an outer ring;
the first output component includes a radially extending and axially facing surface, with the recesses of the first output component arranged on the surface in a circle;
the second output component includes a radially extending and axially facing surface, with the recesses of the second output component arranged on the surface in a circle; and
the recesses of the first output component adjacent to the inner ring of recesses of the input component and the recesses of the second output component adjacent to the outer ring of recesses of the input component.

9. The clutch assembly of claim 7 wherein:
the laterally extending projection at the first end of the locking member extends longitudinally past the first end of the locking member.

10. The clutch assembly of claim 7 wherein:
the laterally extending projection at the first end of the locking member extends past a side surface of the locking member.

11. The clutch assembly of claim 7 including:
a biasing member between the laterally extending projection at the first end of the locking member and the input component wherein the biasing member is in a non-contacting relationship with a lower face of the locking member.

12. The clutch assembly of claim 7 including:
an actuation member engaging the locking member of the first set of locking members between the pivot axis and the first end.

13. The clutch assembly of claim 7 including:
a biasing member engaging the locking member of the first set of locking members between the pivot axis and the first end; and
an actuation member engaging the locking member of the first set of locking members between the pivot axis and the first end.

14. The clutch assembly of claim 13 including:
a biasing member engaging the locking member of the second set of locking members between the pivot axis and the first end; and
an actuation member engaging the locking member of the second set of locking members between the pivot axis and the second end.

15. The clutch assembly of claim 7 wherein:
the first set of locking members includes opposing locking members operative to couple the input component to the first output component in both directions of rotation.

16. The clutch assembly of claim 7 wherein:
the second set of locking members includes opposing locking members operative to couple the input component to the second output component in both directions of rotation.

17. The clutch assembly of claim 7 wherein:
the actuation mechanism includes a translator operative for movement wherein movement of the translator acts on both the first set of locking members and the second set of locking members.

18. A clutch assembly comprising:
an input member supported for rotation about a longitudinal axis, the input member including a side surface extending transverse to the longitudinal axis, the side surface includes a plurality of recesses communicating with the side surface of the input member;
a first output member supported for rotation about the longitudinal axis, the first output member having a side surface extending transverse to the longitudinal axis and faces the side surface of the input member, the first output member includes a plurality of recesses communicating with the side surface of the first output member;
a second output member supported for rotation about the longitudinal axis, the second output member having a side surface extending transverse to the longitudinal axis and faces the side surface of the input member, the second output member includes a plurality of recesses communicating with the side surface of the second output member;
a first coupling assembly selectively coupling the input member to the first output member, the first coupling assembly including a locking element movable between a deployed and nondeployed position, the locking element including a first end, a second end, and a pivot axis between the first end and the second end, a biasing member and an actuation member both the biasing member and actuation member engaging the locking element between the first end and the pivot axis; and
a second coupling assembly selectively coupling the input member to the second output member including a locking element movable between a deployed and nondeployed position, the locking element including a first end, a second end, and a pivot axis between the first end and the second end, a biasing member and an actuation member the biasing member engaging the locking element between the first end and the pivot axis and the actuation member engaging the locking element between the second end and the pivot axis, wherein the first coupling assembly operates independent of the second coupling assembly, and the second coupling assembly operates independent of the first coupling assembly.

19. The clutch assembly of claim 18 wherein:
the locking element of the first coupling assembly includes a laterally extending projection at the first end of the locking member; and
the locking element of the second coupling assembly includes a projection extending from the second end of the locking member.

20. The clutch assembly of claim 19 wherein:
the biasing member of the first coupling assembly engages the laterally extending projection at the first end of the locking member of the first coupling assembly; and
the actuation member of the second coupling assembly engages the projection extending from the second end of the locking member of the second coupling assembly.

* * * * *